United States Patent
Mueller et al.

(10) Patent No.: US 7,446,343 B2
(45) Date of Patent: Nov. 4, 2008

(54) PHOSPHOR CONVERTED LIGHT EMITTING DEVICE

(75) Inventors: Gerd O. Mueller, San Jose, CA (US); Regina B Mueller-Mach, San Jose, CA (US); Thomas Juestel, Aachen (DE); Petra Huppertz, Roetgen (DE); Detlef Uwe Wiechert, Alsdorf (DE); Dominik Uhlich, Buende (DE)

(73) Assignees: Philips Lumileds Lighting Company, LLC, San Jose, CA (US); Koninklijke Philips Electronics N.V. et al., Eindhoven (NL)

( * ) Notice: Subject to any disclaimer, the term of this patent is extended or adjusted under 35 U.S.C. 154(b) by 110 days.

(21) Appl. No.: 11/623,068

(22) Filed: Jan. 13, 2007

(65) Prior Publication Data
US 2008/0023712 A1 Jan. 31, 2008

(30) Foreign Application Priority Data
Jan. 16, 2006 (EP) .................. 06100385

(51) Int. Cl.
*H01L 29/20* (2006.01)
(52) U.S. Cl. ............... 257/89; 257/88; 257/98
(58) Field of Classification Search ............ 257/88, 257/89, 98
See application file for complete search history.

(56) References Cited

U.S. PATENT DOCUMENTS

| | | | |
|---|---|---|---|
| 6,274,924 B1 | 8/2001 | Carey et al. | |
| 6,351,069 B1 | 2/2002 | Lowery et al. | |
| 6,466,135 B1 * | 10/2002 | Srivastava et al. | 340/815.4 |
| 6,576,488 B2 | 6/2003 | Collins, III et al. | |
| 6,630,691 B1 | 10/2003 | Mueller-Mach et al. | |
| 6,642,618 B2 | 11/2003 | Yagi et al. | |
| 6,650,044 B1 | 11/2003 | Lowery | |
| 6,686,691 B1 * | 2/2004 | Mueller et al. | 313/503 |
| 7,053,419 B1 | 5/2006 | Camras et al. | |
| 7,064,355 B2 | 6/2006 | Camras et al. | |
| 7,157,745 B2 * | 1/2007 | Blonder et al. | 257/98 |
| 2005/0269582 A1 | 12/2005 | Mueller et al. | |

FOREIGN PATENT DOCUMENTS

DE  10349038 A1  5/2004

OTHER PUBLICATIONS

Translation of DE 10349038.

* cited by examiner

*Primary Examiner*—Douglas M Menz
(74) *Attorney, Agent, or Firm*—Patent Law Group LLP; Rachel V. Leiterman (57) ABSTRACT

A phosphor converted light emitting device includes a semiconductor structure comprising a light emitting layer disposed between an n-type region and a p-type region, the light emitting layer being configured to emit light having a first peak wavelength; a first phosphor configured to emit light having a second peak wavelength; and a second phosphor configured to emit light having a third peak wavelength. The second phosphor is an $Eu^{3+}$-activated phosphor, configured such that in the excitation spectrum at 298K and 1.013 bar, a maximum intensity in a wavelength range between 460 nm and 470 nm is at least 5% of a maximum intensity in a wavelength range between 220 nm to 320 nm.

20 Claims, 8 Drawing Sheets

PHOSPHOR CONVERTED LIGHT EMITTING DEVICE

BACKGROUND

1. Field of Invention

The present invention relates to phosphor-converted semiconductor light emitting devices.

2. Description of Related Art

Semiconductor light-emitting devices including light emitting diodes (LEDs), resonant cavity light emitting diodes (RCLEDs), vertical cavity laser diodes (VCSELs), and edge emitting lasers are among the most efficient light sources currently available. Materials systems currently of interest in the manufacture of high-brightness light emitting devices capable of operation across the visible spectrum include Group III-V semiconductors, particularly binary, ternary, and quaternary alloys of gallium, aluminum, indium, and nitrogen, also referred to as III-nitride materials. Typically, III-nitride light emitting devices are fabricated by epitaxially growing a stack of semiconductor layers of different compositions and dopant concentrations on a sapphire, silicon carbide, III-nitride, or other suitable substrate by metal-organic chemical vapor deposition (MOCVD), molecular beam epitaxy (MBE), or other epitaxial techniques. The stack often includes one or more n-type layers doped with, for example, Si, formed over the substrate, one or more light emitting layers in an active region formed over the n-type layer or layers, and one or more p-type layers doped with, for example, Mg, formed over the active region. Electrical contacts are formed on the n- and p-type regions.

Since the light emitted by current commercially available III-nitride devices is generally on the shorter wavelength end of the visible spectrum, the light generated by III-nitride devices can be readily converted to produce light having a longer wavelength. It is well known in the art that light having a first peak wavelength (the "primary light") can be converted into light having a longer peak wavelength (the "secondary light") using a process known as luminescence/fluorescence. The fluorescent process involves absorbing the primary light by a wavelength-converting material such as a phosphor and exciting the luminescent centers of the phosphor material, which emit the secondary light. The peak wavelength of the secondary light will depend on the phosphor material. The type of phosphor material can be chosen to yield secondary light having a particular peak wavelength.

In a common application, the light emitting device and phosphor material are selected such that the combined primary and secondary light appear white. In a conventional white light phosphor converted LED, a III-nitride die that emits blue light is combined with a phosphor that emits yellow light, such as $Y_3Al_5O_{12}:Ce^{3+}$. Such white light devices typically have undesirable color rendering properties since the combined light is deficient in the red region of the visible light spectrum.

U.S. Pat. No. 6,351,069 describes a phosphor-converted LED including two phosphors, a first phosphor that emits yellow light and a second phosphor that emits red light.

SUMMARY

In accordance with embodiments of the invention, a phosphor converted light emitting device includes a semiconductor structure comprising a light emitting layer disposed between an n-type region and a p-type region, the light emitting layer being configured to emit light having a first peak wavelength; a first phosphor configured to emit light having a second peak wavelength; and a second phosphor configured to emit light having a third peak wavelength. The second phosphor is an $Eu^{3+}$ activated phosphor, configured such that in the excitation spectrum at 298K and 1.013 bar, a maximum intensity in a wavelength range between 460 nm and 470 nm is at least 5% of a maximum intensity in a wavelength range between 220 nm to 320 nm.

DETAILED DESCRIPTION $Eu^{2+}$ activated red emitting phosphors are undesirably unstable because of the tendency of $Eu^{2+}$ to oxidize or react with other components present in the light emitting device. Another drawback of $Eu^{2+}$ activated red-emitting phosphors is their relatively wide emission band, which results in a low lumen equivalent.

$Eu^{3+}$ activated red-emitting phosphors are generally more stable over their lifetime as compared to $Eu^{2+}$ activated phosphors, but $Eu^{3+}$ activated phosphors generally are strongly absorbing only in the very short wavelength UV-C and VUV spectral ranges, while the absorption is very weak at longer wavelengths, particularly visible wavelengths. Poor absorption at longer wavelengths disfavors the application of such $Eu^{3+}$ phosphors in phosphor-converted light emitting devices, since the emission wavelength of efficient high brightness LEDs used in such devices is generally within the near UV-A spectral range above 350 nm or within the blue spectral range, much longer wavelengths than the wavelength range in which such $Eu^{3+}$ activated phosphors are strongly absorbing.

In accordance with embodiments of the invention, a phosphor converted light emitting device includes an $Eu^{3+}$ activated red emitting phosphor with an excitation spectrum suitable for use with a blue-emitting LED. In some embodiments, in the excitation spectrum of the $Eu^{3+}$ activated phosphor material at 298 K and 1.013 bar, the maximum intensity in the wavelength range between 460 nm and 470 nm at least 5% of the maximum intensity in the wavelength range between 220 nm and 320 nm. As used herein, in absorption spectra, the term "intensity" denotes the amount of absorbed light (corresponding to an absorption strength).

In some embodiments, in the $Eu^{3+}$ activated red phosphor, at least 90%, more preferably at least 95%, and more preferably at least 98% of the Eu atoms in the phosphor are in the form of $Eu^{3+}$. The spectral (absorption and emission) properties of $Eu^{3+}$ materials are more stable over time as compared to $Eu^{2+}$ materials, since $Eu^{3+}$ does not oxidize as readily as $Eu^{2+}$. Accordingly, the fewer $Eu^{2+}$ atoms, the better the lifetime behavior of the phosphor material.

With an enhanced absorption capability of the $Eu^{3+}$ activated phosphor material in the above-specified blue spectral range, a light-emitting device according to embodiments of the present invention may be operated efficiently with LEDs with blue primary light. The absorption strength of a converting element depends on the absorption strength of the material itself and on the thickness of the converting element in the primary light propagation direction. To obtain an equal absorption strength, a more effective light conversion material (high absorption strength of the material itself) according to embodiments of the invention may enable the application of thinner phosphor materials for more compact devices, and/or may reduce the risk of re-absorption of the secondary light and following radiation-less transition, leading to an enhanced efficiency of the light emitting device due to a thinner converting element. An enhancement of the blue absorption capability simultaneously also enhances the absorption capability in the near UV-A range between 350 nm and 420 nm. Therefore, in embodiments of the invention, LEDs emitting within the UV-A spectral range may also be combined with a phosphor material according to the embodiments of the present invention.

In some embodiments, in the emission spectrum of the $Eu^{3+}$ activated phosphor material at 298 K and 1.013 bar, the peak area in the wavelength range between 680 nm to 720 nm is at least 15% of the peak area in the wavelength range between 570 nm to 720 nm. Such devices show deep red emission characteristics in that for some applications efficiencies of 100-200 Lumen/Watt are feasible. Such devices may also show improved color point stability due to the stability of the red phosphor. As used herein, the term "peak area" denotes the integral amount of light within the specified wavelength range.

In an embodiment of the present invention, the atomic dopant level (in atom-% of the trivalent cation of the host lattice) of Eu in the $Eu^{3+}$ activated phosphor material is up to and including 20%. Higher $Eu^{3+}$ concentration may lead to pronounced energy transfer of the absorbed energy to the surface and defect sites and thus to quenching of the $Eu^{3+}$ luminescence, a phenomenon known as concentration quenching.

In an embodiment of the present invention, the $Eu^{3+}$ activated phosphor material further comprises a co-dopant M selected from the group comprising Bi, In, Tl, Sb or mixtures thereof. These additional dopants are elements with a large number of electrons on d-orbitals, which increases the electron density to enhance the absorption capability of $Eu^{3+}$ within the host lattice. In an embodiment of the present invention, the atomic dopant concentration of M (in atom-%) in the $Eu^{3+}$ activated material is up to 20%. Higher $M^{3+}$ concentration may lead to pronounced energy transfer of the absorbed energy to the surface and defect sites and thus to quenching of the activator luminescence.

In an embodiment of the present invention, the ratio of Eu (in atom-%) to M (in atom-%) in the $Eu^{3+}$ activated material is 0.1:1 to 10:1. If more than one co-dopant is present, in the above ratio of Eu:M, M may represent the sum of all co-dopants.

In an embodiment of the present invention, the $Eu^{3+}$ activated phosphor material is selected from the group of oxides, oxyhalogenides, garnets, vanadates, tungstates, borates, silicates, germanates or mixtures thereof. These materials offer a high electron density at the sites of the oxygen anions within the host lattice, leading to improved absorption properties of $Eu^{3+}$.

According to an embodiment of the present invention, the $Eu^{3+}$ activated phosphor material is selected from the group of $(Gd_{1-x-z}Lu_x)_2O_3:Eu_z$, $(Y_{1-x-y-z}Gd_xLu_y)_3Al_5O_{12}:Eu_z$, $Ba_2(Y_{1-x-y-z}Gd_xLu_y)_2Si_4O_{13}:Eu_z$, $Ba_2(Y_{1-x-y-z}Gd_xLu_y)_2Ge_4O_{13}:Eu_z$, $(Y_{1-x-y-z}Gd_xLu_y)VO_4:Eu_z$, $(Y_{1-x-y-z}Gd_xLu_y)OF:Eu_z$, $(Y_{1-x-y-z}Gd_xLu_y)OCl:Eu_z$, $Ba(Y_{1-x-y-z}Gd_xLu_y)B_9O_{16}:Eu_z$, $Ba_3(Y_{1-x-y-z}Gd_xLu_y)(BO_3)_3:Eu_z$, $(Y_{1-x-y-z}Gd_xLu_y)_2SiO_5:Eu_z$, $(Ca_{1-a}Sr_a)_3(Y_{1-w-x-y-z}Lu_wGa_xIn_y)_2Ge_3O_{12}:Eu_z$ (a, w, x, y=0.0-1.0, z=0.0-0.2), $(Ca_{1-a}Sr_a)_3(Y_{1-w-x-y-z}Lu_vGa_wIn_x)_2Ge_3O_{12}:Eu_yBi_z$ (a, v, w, x=0.0-1.0, y, z=0.0-0.2), LaOM:Eu with M=(Br, Cl, I), $Na_9[(Y_{1-x-y-z}Lu_xGd_y)W_{10}O_{36}]:Eu_z$, $(Y_{1-x-y-z}Lu_xGd_y)[P(Mo_3O_{10})_4]:Eu_z$ (x, y=0.0-1.0, z=0.0-0.2), and mixtures thereof. Here, $Eu^{3+}$ is surrounded from ions with high negative charge density leading to an enhanced absorption properties in the near UV-A and blue spectral range.

A light-emitting device according to the present invention may be of use in a broad variety of systems and/or applications, including one or more of the following: office lighting systems, household application systems, shop lighting systems, home lighting systems, accent lighting systems, spot lighting systems, theater lighting systems, fiber-optic application systems, projection systems, self-lit display systems, pixelated display systems, segmented display systems, warning sign systems, medical lighting application systems, indicator sign systems, decorative lighting systems, portable systems, automotive applications, and green house lighting systems.

The aforementioned components, as well as the claimed components and the components to be used in accordance with embodiments of the invention, are not subject to any special exceptions with respect to their size, shape, material selection and technical concept such that the selection criteria known in the pertinent field can be applied without limitation.

Figure 1:
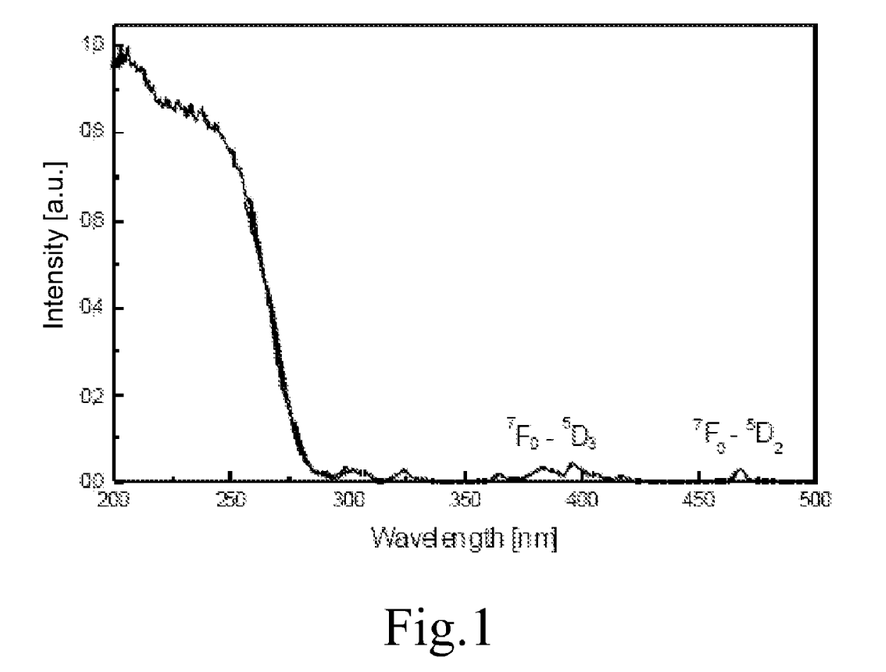
FIG. 1 shows an excitation spectrum of a $Y_2O_3:Eu$ material with weak absorption at wavelengths greater than 300 nm.
Figure 2:
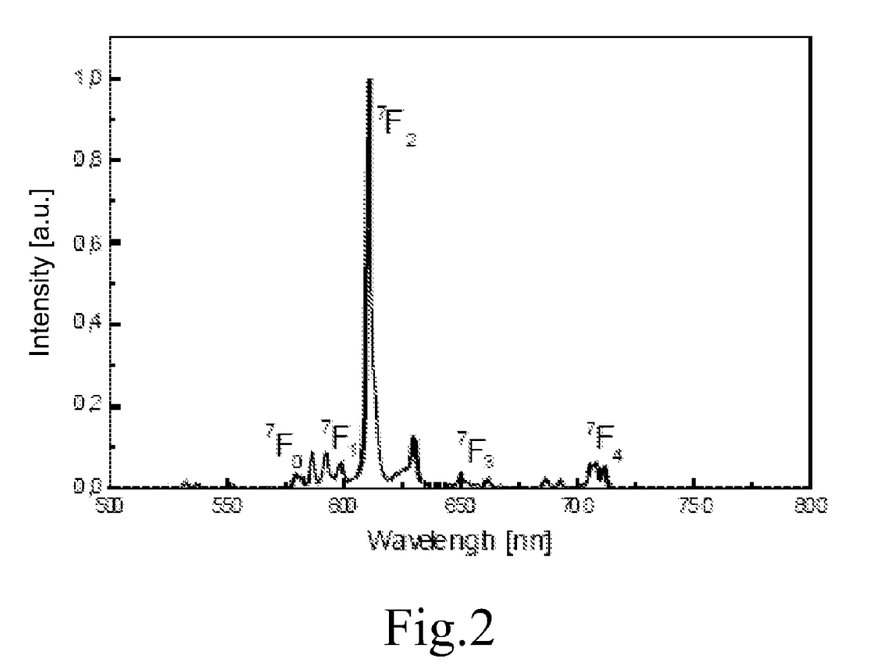
FIG. 2 shows an emission spectrum of the material of FIG. 1.

FIGS. 1 and 2 show the excitation and emission spectra of an $Y_2O_3$:Eu material with a Eu-doping level of 5%. While the absorption of the $Eu^{3+}$ phosphor in the UV-C and VUV spectral range is strong, it is very weak below the low energy edge of the charge transfer state around 300 nm. This weak absorption at wavelengths greater than 300 nm prevents the application of $Eu^{3+}$ phosphors with spectra as illustrated in FIGS. 1 and 2 in phosphor converted light emitting diodes, since the minimum emission wavelength for efficient high brightness LEDs is generally at least 370 nm, which is outside the strong absorption wavelength range the $Y_2O_3$:Eu phosphor material.

The absorption lines around 395 nm ($^7F_0$-$^5D_3$) and 465 nm ($^7F_0$-$^5D_2$) are spin forbidden 4f-4f transitions and therefore very weak absorption lines.

Red line-emitting $Eu^{3+}$ phosphors according to embodiments of the invention have relatively strong absorption of UV-A radiation and/or blue radiation due to the enhancement of the weak absorption lines at around 395 nm ($^7F_0$-$^5D_3$) and 465 nm ($^7F_0$-$^5D_2$). This is achieved by using lattices with a high covalency or by co-doping the host lattice by ions having the $[Ar]3d^{10}$, $[Kr]4d^{10}$ or $[Xe]4f^{14}5d^{10}$ electron configuration. By the application of covalent lattices or electron rich co-dopants, the spin forbidden character of the 4f-4f transitions of $Eu^{3+}$ is relaxed to a certain extent, which results in an enhanced absorption strength of these transitions. The improved absorption properties enable the efficient application of these materials as a color converter for organic or inorganic state of the art light emitting diodes with emission wavelengths in the UV-A and/or blue spectral range.

Suitable Eu-comprising phosphor materials for the absorption enhancement according to the present invention are high covalent lattices such as $(Gd_{1-x}Lu_x)_2O_3$:Eu, $(Y_{1-x-y}Gd_xLu_y)_3Al_5O_{12}$:Eu, $Ba_2(Y_{1-x-y}Gd_xLu_y)_2Si_4O_{13}$:Eu, $Ba_2(Y_{1-x-y}Gd_xLu_y)_2Ge_4O_{13}$:Eu, $(Y_{1-x-y}Gd_xLu_y)VO_4$:Eu, $(Y_{1-x-y}Gd_xLu_y)OF$:$Eu_z$, $(Y_{1-x-y}Gd_xLu_y)OCl$:Eu, $Ba(Y_{1-x-y}Gd_xLu_y)B_9O_{16}$:Eu, $Ba_3(Y_{1-x-y}Gd_xLu_y)(BO_3)_3$:Eu, $(Y_{1-x-y}Gd_xLu_y)_2SiO_5$:Eu, $(Ca_{1-a}Sr_a)_3(Y_{1-w-x-y-z}Lu_wGa_xIn_y)_2Ge_3O_{12}$:Eu, (a, w, x, y=0.0-1.0, z=0.0-0.2), $(Ca_{1-a}Sr_a)_3(Y_{1-w-x-y-z}Lu_vGa_wIn_x)_2Ge_3O_{12}$:$Eu_yBi_z$(a, v, w, x=0.0-1.0, y, z=0.0-0.2), LaOM:Eu with M=(Br, Cl, I) and mixtures thereof. Here, $Eu^{3+}$ is surrounded by ions with high negative charge density. Suitable Eu-doping levels are up to atomic 20%. Within these materials, $Eu^{3+}$ exhibits a strong covalent interaction with the host lattice influencing the transition probability of the spin forbidden transition in comparison to atomic transition probabilities.

The covalent interaction of $Eu^{3+}$ with the host lattices can be even more enhanced by co-doping of the host lattice with other triple positive charged ions such as $Bi^{3+}$, $In^{3+}$, $Tl^{3+}$ or $Sb^{3+}$ or mixtures thereof. For example, suitable $In^{3+}$ co-doping levels are up to atomic 10%. According to another embodiment of the present invention, the atomic dopant level of M in the Eu-comprising phosphor material is up to 5%. According to another embodiment of the present invention, the atomic dopant level of M in the Eu-comprising phosphor material is up to 1%.

According to an embodiment of the present invention, the ratio in atom % of Eu to M in the Eu-comprising phosphor material is between 0.5:1 and 5:1. According to an embodiment of the present invention, the ratio in atom % of Eu to M in the Eu-comprising phosphor material is 1:1 to 3:1. When more than one co-dopant M is present, the M term in the above ratios represents the sum of all co-dopants.

The absorbed excitation energy is generally released by secondary radiation with longer wavelength. Before radiation release (electron transition from the excited to the ground state), the excited D-levels relax radiation-less to the excited D-ground state $^5D_0$. According to the transition rules, transitions to the $^7F_2$ state are allowed, while transitions to the $^7F_4$ state leading to a deep red emission are spin-forbidden. To increase light efficiency and color rendering index, deep red emission with wavelengths around 700 nm are preferred. The high electron density of the $Eu^{3+}$-comprising phosphor materials according to the present invention also influences the emission properties, where the spin forbidden transition $^5D_0 \rightarrow ^7F_4$ is enhanced in comparison to the allowed transition $^5D_0 \rightarrow ^7F_2$.

The following examples show the improved absorption and emission properties of $Eu^{3+}$ comprising phosphor materials according to embodiments of the present invention. For a better comparison to the phosphor shown in FIGS. 1 and 2, all below examples contain the same Eu-doping level of 5 atom % $Eu^{3+}$. The presence of $Eu^{3+}$ is predetermined by the material preparation. People of skill in the art know which starting materials have to be chosen in order to prepare materials essentially comprising $Eu^{3+}$.

EXAMPLE I

Figure 3:
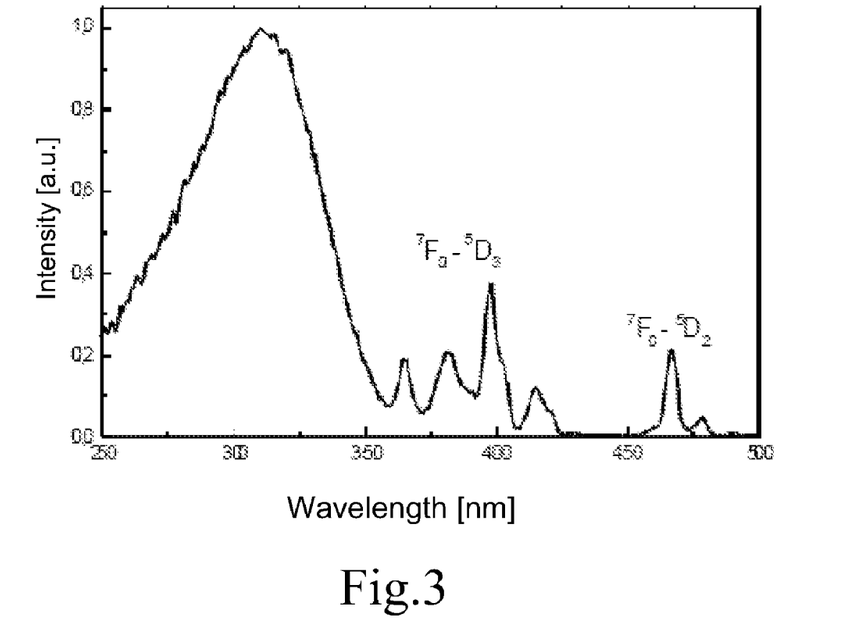
FIG. 3 shows an excitation spectrum of a first example of an Eu-comprising material according to embodiments of the present invention.
Figure 4:
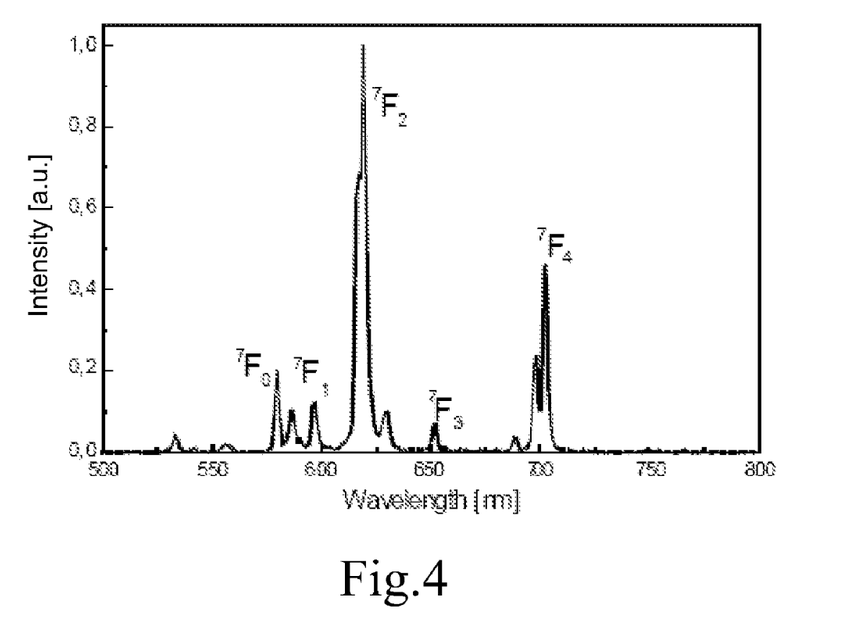
FIG. 4 shows an emission spectrum of the material of FIG. 3.

FIGS. 3 and 4 show the excitation and emission spectra of LaOCl:Eu. In FIG. 3, the maximum intensity in the wavelength range between 460 nm and 470 nm is about 21% of the maximum intensity in the wavelength range between 220 nm and 320 nm. In FIG. 4, the peak area in the wavelength range between 680 nm and 720 nm is 22% of the peak area in the wavelength range between 570 nm and 720 nm.

EXAMPLE II

Figure 5:
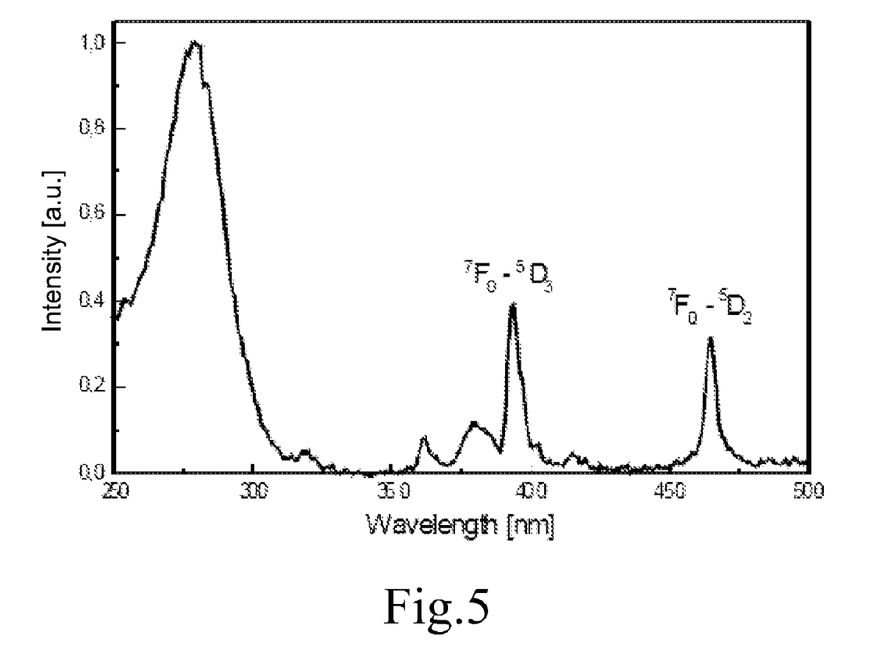
FIG. 5 shows an excitation spectrum of a second example of an Eu-comprising material according to embodiments of the present invention.
Figure 6:
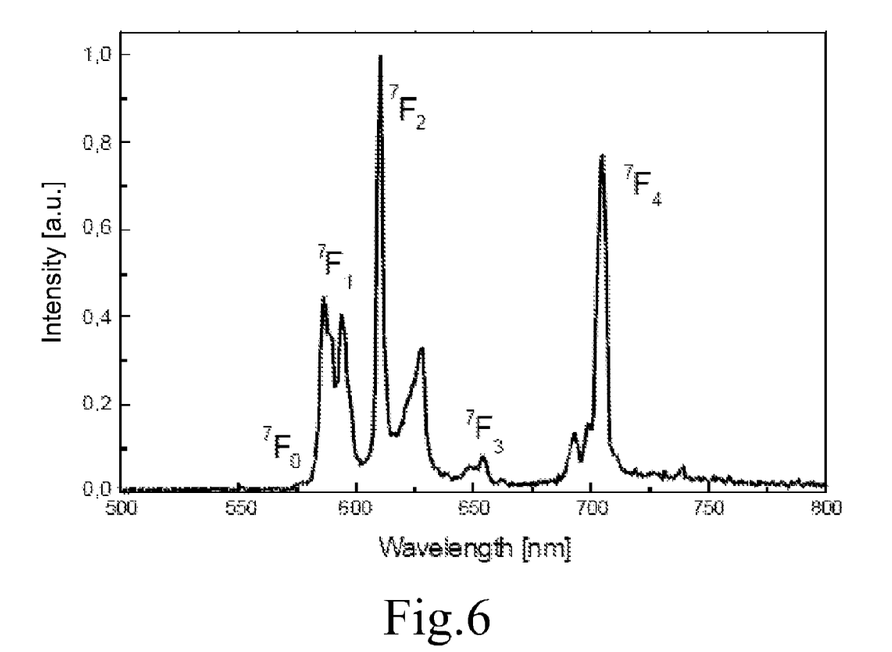
FIG. 6 shows an emission spectrum of the material of FIG. 5.

FIGS. 5 and 6 show the excitation and emission spectra of $Sr_3In_2Ge_3O_{12}$:Eu. In FIG. 5, the maximum intensity in the wavelength range between 460 nm and 470 nm is about 25% of the maximum intensity in the wavelength range between 220 nm and 320 nm. In FIG. 6, the peak area in the wavelength range between 680 nm and 720 nm is 25% of the peak area in the wavelength range between 570 nm and 720 nm.

EXAMPLE III

Figure 7:
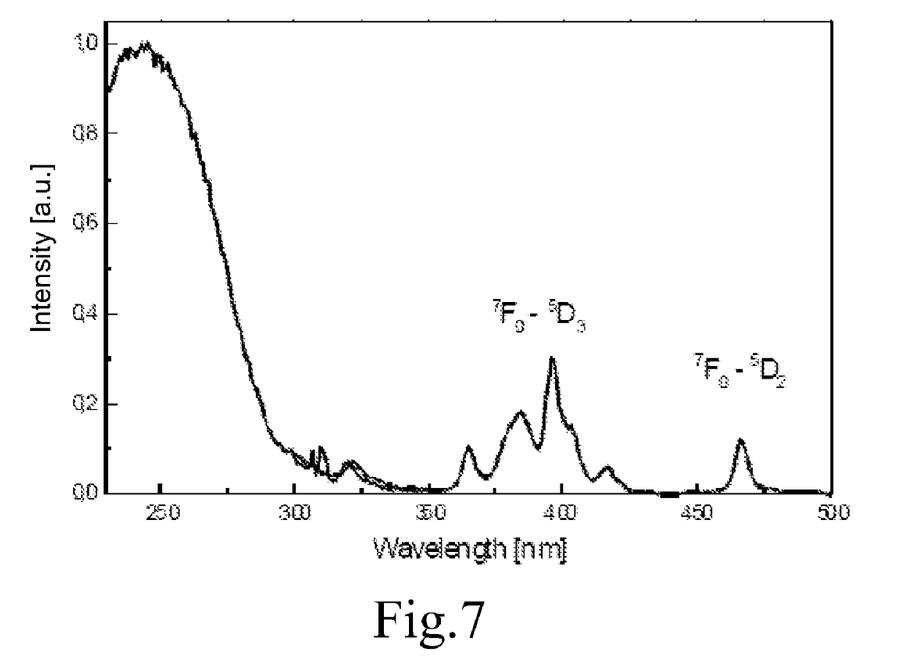
FIG. 7 shows an excitation spectrum of a third example of an Eu-comprising material according to embodiments of the present invention.
Figure 8:
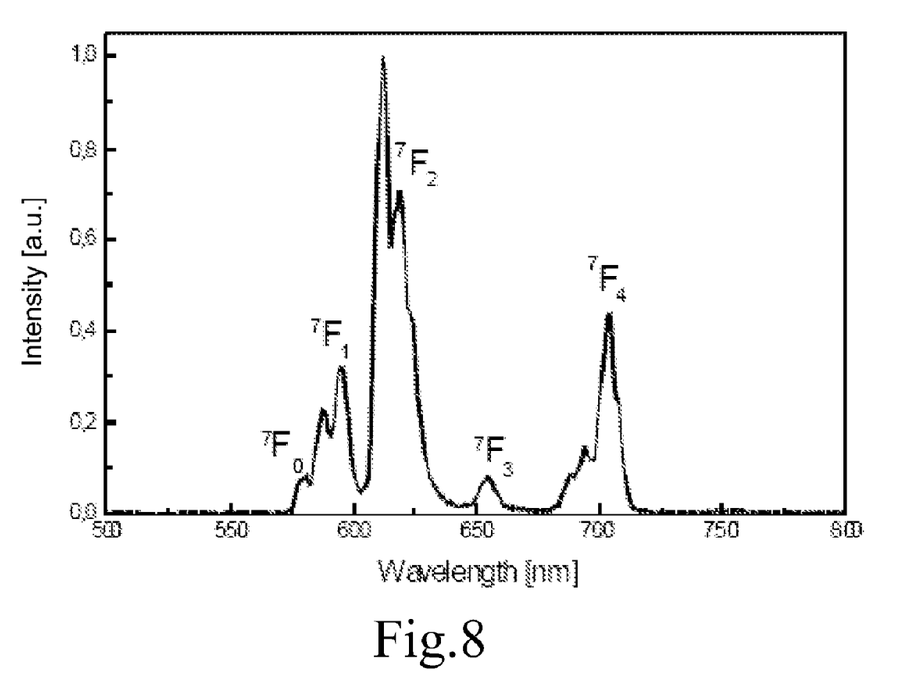
FIG. 8 shows an emission spectrum of the material of FIG. 7.

FIGS. 7 and 8 show the excitation and emission spectra of $Y_2SiO_5$:Eu. In FIG. 7, the maximum intensity in the wavelength range between 460 nm and 470 nm is about 11% of the maximum intensity in the wavelength range between 220 nm and 320 nm. In FIG. 8, the peak area in the wavelength range between 680 nm and 720 nm is 21% of the peak area in the wavelength range between 570 nm and 720 nm.

EXAMPLE IV

Figure 9:
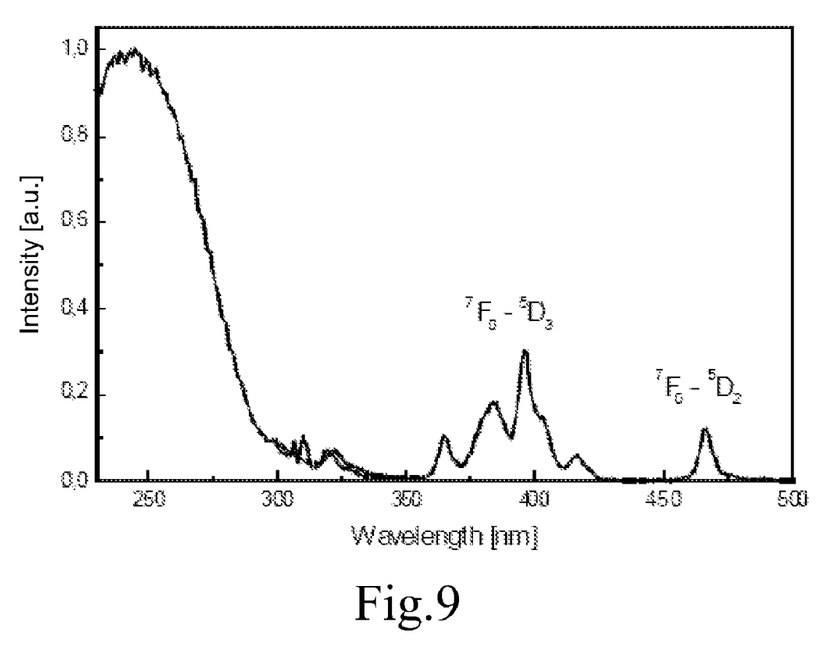
FIG. 9 shows an excitation spectrum of a fourth example of an Eu-comprising material according embodiments of the present invention.
Figure 10:
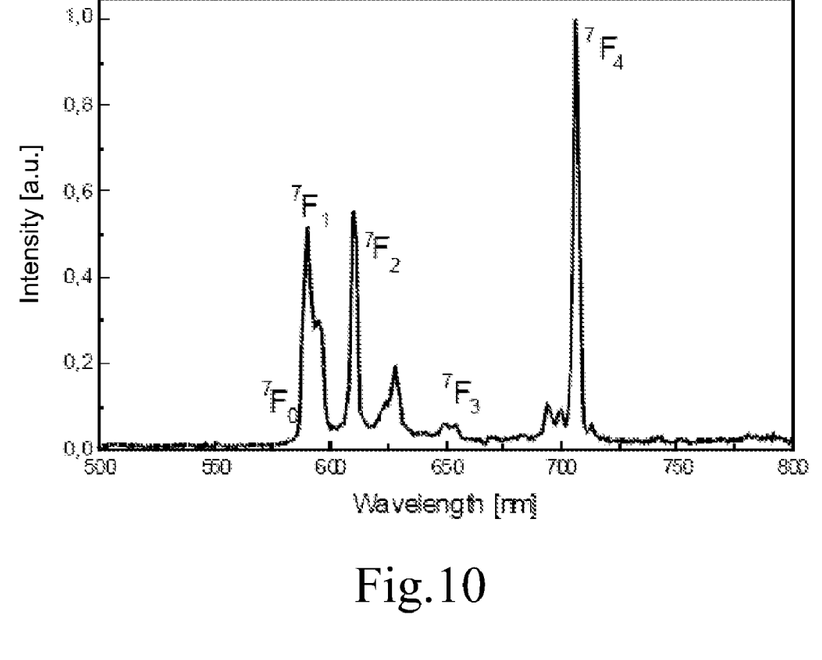
FIG. 10 shows an emission spectrum of the material of FIG. 9.

FIGS. 9 and 10 show the excitation and emission spectra of $Ca_3Ga_2Ge_3O_{12}$:Eu. In FIG. 9, the maximum intensity in the wavelength range between 460 nm and 470 nm is about 11% of the maximum intensity in the wavelength range between 220 nm and 320 nm. In FIG. 10, the peak area in the wavelength range between 680 nm and 720 nm is 27% of the peak area in the wavelength range between 570 nm and 720 nm.

According to an embodiment of the present invention, in the excitation spectrum of the Eu-comprising phosphor material at 298 K and 1.013 bar, the maximum intensity in the wavelength range between 460 nm and 470 nm is at least 10% of the maximum intensity in the wavelength range between 220 nm and 320 nm, as shown for examples III and IV above.

According to another embodiment of the present invention, in the excitation spectrum of the Eu-comprising phosphor material at 298 K and 1.013 bar, the maximum intensity in the wavelength range between 460 nm and 470 nm is at least 15% of the maximum intensity in the wavelength range between 220 nm and 320 nm.

According to an embodiment of the present invention, in the excitation spectrum of the Eu-comprising phosphor material at 298 K and 1.013 bar, the maximum intensity in the wavelength range between 460 nm and 470 nm is at least 20% of the maximum intensity in the wavelength range between 220 nm and 320 nm, as shown for examples I and II above.

According to an embodiment of the present invention, in the emission spectrum of the Eu-comprising phosphor material at 298 K and 1.013 bar, the peak area in the wavelength range between 680 nm and 720 nm is at least 20% of the peak area in the wavelength range between 570 nm and 720 nm, as shown for examples I, II, III, and IV above. Other Eu-comprising phosphor materials may exhibit different peak area ratios.

EXAMPLE V

Figure 11:
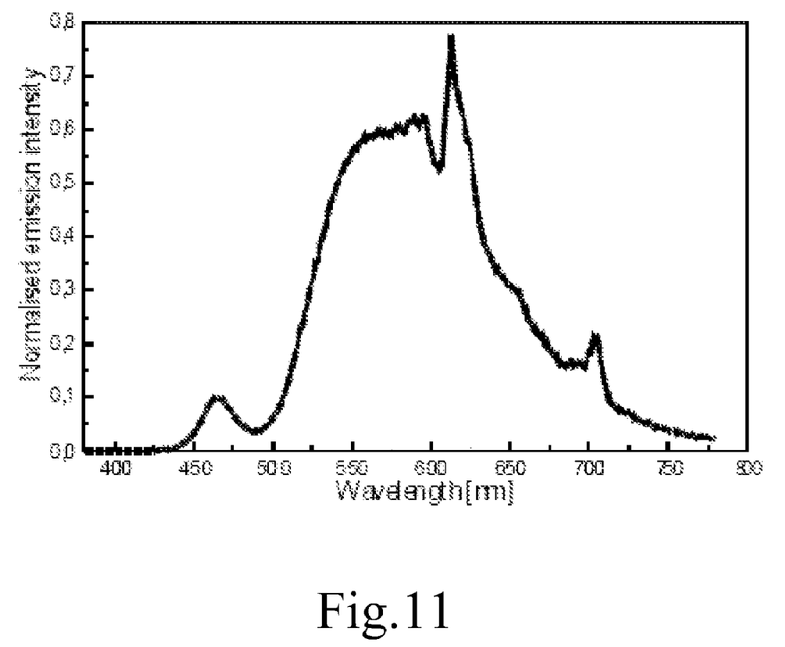
FIGS. 11 and 12 show emission spectra of devices according to embodiments of the present invention.

FIG. 11 shows an emission spectrum of an LED according to an embodiment of the present invention. The LED was manufactured as follows: a powder mixture of 20% $(Y,Gd)_3Al_5O_{12}$:Ce and 80% $Y_2SiO_5$:Eu was suspended in a fluid silicone precursor compound. A drop of this silicone precursor was placed on an LED die emitting light of the wavelength 465 nm, then the silicone was polymerized. The LED was then sealed with a plastic lens. FIG. 11 illustrates that the resulting LED shows good optical characteristics with a $T_c$ value of 3000 K.

EXAMPLE VI

Figure 12:
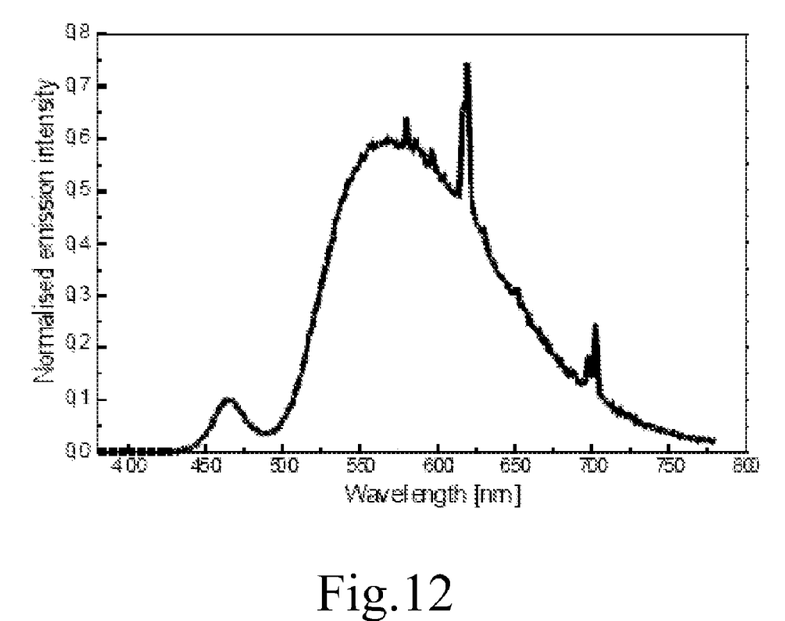

FIG. 12 shows an emission spectrum of an LED according to an embodiment of the present invention. The LED was manufactured as follows: a powder mixture of 20% $(Y,Gd)_3Al_5O_{12}$:Ce and 80% LaOCl:Eu was suspended in a fluid silicone precursor compound. A drop of this silicone precursor was placed on an LED die emitting light of the wavelength 465 nm, then the silicone was polymerized. The LED is then sealed with a plastic lens. FIG. 12 illustrates that the resulting LED shows good optical characteristics with a $T_c$ value of 3100 K.

In other embodiments, Eu-doping levels different from 5 atom % can be chosen in order to adapt for instance the converting element size or the spectral properties of the converting element to the desired application.

The particular combinations of elements and features in the above detailed embodiments are exemplary only; the interchanging and substitution of these teachings with other teachings are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the claims and the equivalents thereto. Furthermore, reference signs used in the description and claims do not limit the scope of the invention as claimed.

MATERIALS AND METHODS

The spectra of the Eu-comprising materials according to the present invention were measured with an in-house built spectrofluorimeter system. The light source of this spectrofluorimeter system is a 150W Xe-lamp in an airflow-cooled housing. The lamp output is focused on the entrance slit of the excitation monochromator (Bentham) with a focal length of 0.5 m. The escaping light from the exit slit of the excitation monochromator is fed into a sample chamber and focused onto the sample material under test via several mirrors. While the sample under test is oriented horizontally, the optical axis of the excitation and the emission branch are oriented vertically and nearly parallel. This geometric orientation ensures reliable and quantitative comparative measurements of different samples. The sample chamber is coupled optically to the emission monochromator (Bentham, focal length 0.5m) via a mirror system. Detection of the emitted light occurs with a thermo-electrically cooled photomultiplier tube (PMT) unit mounted to the exit slit of the emission monochromator. The system is fully computer controlled by an in-house developed software program based on DOS.

The sample under test is shaped as a powder layer of 2 mm thickness and the spot size of the excitation light beam is approximately 2×3 mm². The spectral resolution of the excitation and emission branch was in the order of 1-2 nm. A 1 nm step size was chosen for the determination of the excitation and emission spectra.

The $Eu^{3+}$ activated red emitting phosphors described above are particularly promising for use in phosphor converted LEDs configured to emit white light. In such devices, a blue emitting LED may combined with a yellow or green emitting phosphor and a red emitting $Eu^{3+}$ activated phosphor; or a UV emitting LED may be combined with a blue emitting phosphor, a yellow or green emitting phosphor, and a red emitting $Eu^{3+}$ activated phosphor.

Suitable yellow or green emitting phosphors include aluminum garnet phosphors with the general formula $(Lu_{1-x-y-a-b}Y_xGd_y)_3(Al_{1-z}Ga_z)_5O_{12}:Ce_aPr_b$ wherein $0<x<1$, $0<y<1$, $0<z\leq0.1$, $0<a\leq0.2$ and $0<b\leq0.1$, such as $Lu_3Al_5O_{12}:Ce^{3+}$ and $Y_3Al_5O_{12}:Ce^{3+}$; $SrSi_2N_2O_2:Eu^{2+}$; $(Sr_{1-u-v-x}Mg_uCa_vBa_x)(Ga_{2-y-z}Al_yIn_zS_4):Eu^{2+}$ including, for example, $SrGa_2S_4:Eu^{2+}$; and $Sr_{1-x}Ba_xSiO_4:Eu^{2+}$. Suitable blue-emitting phosphors include, for example, $MgSrSiO_4$.

The $Eu^{3+}$ activated red phosphors described above may offer advantages over other red phosphors. First, since the excitation spectrum of the $Eu^{3+}$ activated red phosphors is generally limited to a sharp line (i.e., narrow wavelength range) in the visible spectrum, as illustrated in FIGS. 3, 5, 7 and 9, the $Eu^{3+}$ activated red phosphor does not absorb light emitted by any yellow or green emitting phosphor in the device. As a result, the $Eu^{3+}$ activated red phosphors do not need to be separated from the yellow or green emitting phosphor, permitting great flexibility in the implementation of a white light phosphor-converted LED including an $Eu^{3+}$ activated red phosphor. Second, the color rendering properties of the white light in a device including an $Eu^{3+}$ activated red phosphor may be boosted by the line emission (i.e. narrow wavelength range) from the red phosphor, as illustrated in FIGS. 4, 6, 8, and 10. For example, in some embodiments, the composite light emitted from such devices may have a correlated color temperature (CCT) between 2800 and 3300 K, with a color rendering index Ra between 80 and 87.

Figure 13:
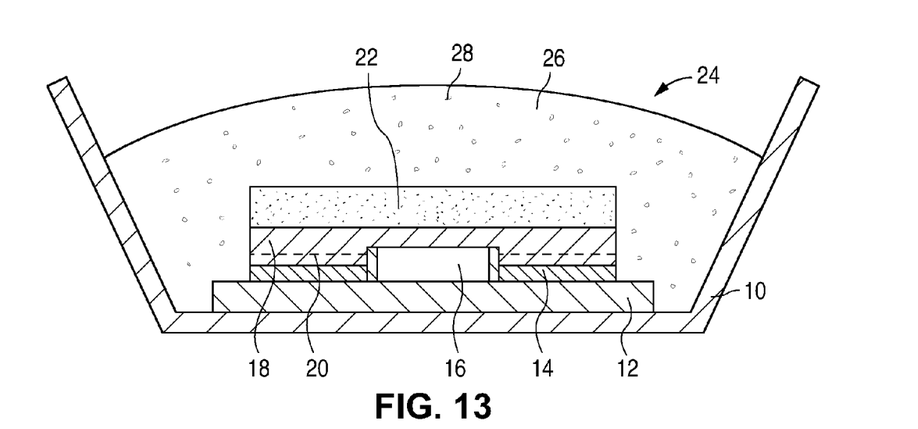
FIG. 13 illustrates a device including an LED, a luminescent ceramic, and a phosphor disposed in a transparent layer.

FIG. 13 is a cross sectional view of a portion of a device including a blue emitting LED combined with a yellow or green emitting phosphor formed as a luminescent ceramic and an $Eu^{3+}$ activated red phosphor as described above. In the device illustrated in FIG. 13, a III-nitride semiconductor structure 18 including at least one light emitting layer 20 disposed between an n-type region and a p-type region is grown on a growth substrate (not shown). Portions of semiconductor structure 18 may be etched to expose regions of each conductivity type, such that p- and n-contacts may be formed on the same side of the device and the device may be mounted as a flip chip.

Semiconductor structure 18 is connected to a mount 12, which may be, for example, ceramic or Si-based, by metal interconnects 14 and 16, which connect the mount to the p- and n-contacts (not shown) on semiconductor structure 18. The growth substrate may remain a part of the device (disposed between semiconductor structure 18 and luminescent ceramic 22) or may be removed from the semiconductor structure. One or both of the p- and n-contacts may be reflective to light generated by light emitting layer 20 such that a majority of light that escapes the semiconductor structure escapes through the top surface of semiconductor structure 18, in the orientation shown in FIG. 13.

A yellow or green emitting phosphor in the form of a luminescent ceramic 22 is disposed over the top surface of semiconductor structure 18. Luminescent ceramics are described in more detail in U.S. Patent Application Publication 2005-0269582, which is incorporated herein by reference. A suitable $Y_3Al_5O_{12}:Ce^{3+}$ ceramic may be produced as follows: 40 g $Y_2O_3$ (99.998%), 32 g $Al_2O_3$ (99.999%), and 3.44 g $CeO_2$ are milled with 1.5 kg high purity alumina balls (2 mm diameter) in isopropanol on a roller bench for 12 hrs. The dried precursor powder is then calcined at 1300° C. for two hours under CO atmosphere. The YAG powder obtained is then deagglomerated with a planet ball mill (agate balls) under ethanol. The ceramic slurry is then slip cast to obtain a ceramic green body after drying. The green bodies are then sintered between graphite plates at 1700° C. for two hours.

Luminescent ceramic 22 may be attached to semiconductor structure 18 by, for example, direct wafer bonding or by an adhesive such as an organic material such as epoxy, acrylic, or silicone; one or more high index inorganic materials; or a sol-gel glass.

Examples of high index materials include high index optical glasses such Schott glass SF59, Schott glass LaSF 3, Schott glass LaSF N18, and mixtures thereof. These glasses are available from Schott Glass Technologies Incorporated, of Duryea, Pa. Examples of other high index materials include high index chalcogenide glass, such as (Ge, Sb, Ga) (S, Se) chalcogenide glasses, III-V semiconductors including but not limited to GaP, InGaP, GaAs, and GaN, II-VI semiconductors including but not limited to ZnS, ZnSe, ZnTe, CdS, CdSe, and CdTe, group IV semiconductors and compounds including but not limited to Si and Ge, organic semiconductors, metal oxides including but not limited to tungsten oxide, titanium oxide, nickel oxide, zirconium oxide, indium tin oxide, and chromium oxide, metal fluorides including but not limited to magnesium fluoride and calcium fluoride, metals including but not limited to Zn, In, Mg, and Sn, yttrium aluminum garnet (YAG), phosphide compounds, arsenide compounds, antimonide compounds, nitride compounds, high index organic compounds, and mixtures or alloys thereof. Gluing with high index inorganic materials is described in more detail in U.S. Pat. No. 7,053,419, which is incorporated herein by reference.

Sol-gel glasses are described in more detail in U.S. Pat. No. 6,642,618, which is incorporated herein by reference. In embodiments where the luminescent ceramic is attached to the semiconductor structure or growth substrate by a sol-gel glass, one or more materials such as oxides of titanium, cerium, lead, gallium, bismuth, cadmium, zinc, barium, or aluminum may be included in the $SiO_2$ sol-gel glass to increase the index of refraction of the glass in order to more closely match the index of the glass with the indices of the luminescent ceramic and the surface of the semiconductor structure to which the luminescent ceramic is attached.

The luminescent ceramic can be textured or molded, ground, machined, hot stamped, or polished into shapes that are desirable, for example, for increased light extraction. For example, a luminescent ceramic may be shaped into a lens such as a dome lens or Fresnel lens, roughened, or textured with a photonic crystal structure, such as a periodic lattice of holes formed in the ceramic. The shaped ceramic layer may be smaller than, the same size as, or larger than the surface to which it is attached.

Mount 12, which supports semiconductor structure 18 and luminescent ceramic 22, may be positioned in a reflective cup 10, then a second phosphor layer 24 is disposed over the luminescent ceramic. Second phosphor layer 24 may include particles 28 of one or more red phosphors, including at least one $Eu^{3+}$ activated red emitting phosphor as described above, disposed in a transparent binder material 26 such as resin, silicone, or epoxy.

Figure 14:
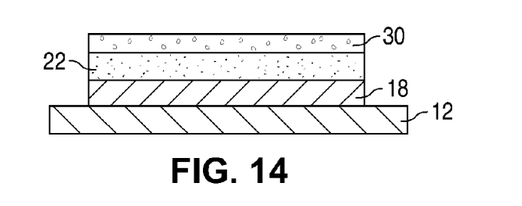
FIG. 14 illustrates a device including an LED and two luminescent ceramics.

FIG. 14 is a cross sectional view of a portion of a device including a blue emitting LED combined with a yellow or green emitting phosphor and an $Eu^{3+}$ activated red emitting phosphor, formed as separate luminescent ceramic layers. As in FIG. 13, a III-nitride semiconductor structure including a light emitting region configured to emit blue light is mounted on a mount 12. A yellow or green emitting phosphor in the form of a luminescent ceramic 22 is disposed over the top surface of semiconductor structure 18. An $Eu^{3+}$ activated red emitting phosphor in the form of a luminescent ceramic 30 is disposed over the top surface of luminescent ceramic 22. Luminescent ceramics 30 and 22 may be connected to each other by, for example, direct wafer bonding or by an adhesive such as an organic material such as epoxy, acrylic, or silicone; one or more high index inorganic materials; or a sol-gel glass, as described above. The positions of luminescent ceramics 30 and 22 relative to semiconductor structure 18 may be reversed. Luminescent ceramics 30 and 22 may each have a thickness between 100 μm and 300 μm.

An $Eu^{3+}$ activated red phosphor may be formed into a luminescent ceramic by heating powder phosphor material until the surface of the powder particles begin to form a strong bond or neck at the contact points of the particles. The temperature and pressure under which sintering occurs may depend on the particular phosphor material used. During sintering, the partially connected particles form a rigid agglomerate that further decreases its porosity by further neck growth. Grain boundaries are formed and move so that some grains grow at the expense of others. This stage of sintering continues while the pore channels are connected (open porosity) until the pores are isolated (closed porosity). In the last stage of sintering, the pores become closed and are slowly eliminated along grain boundaries until the desired degree of densification is achieved.

Figure 15:
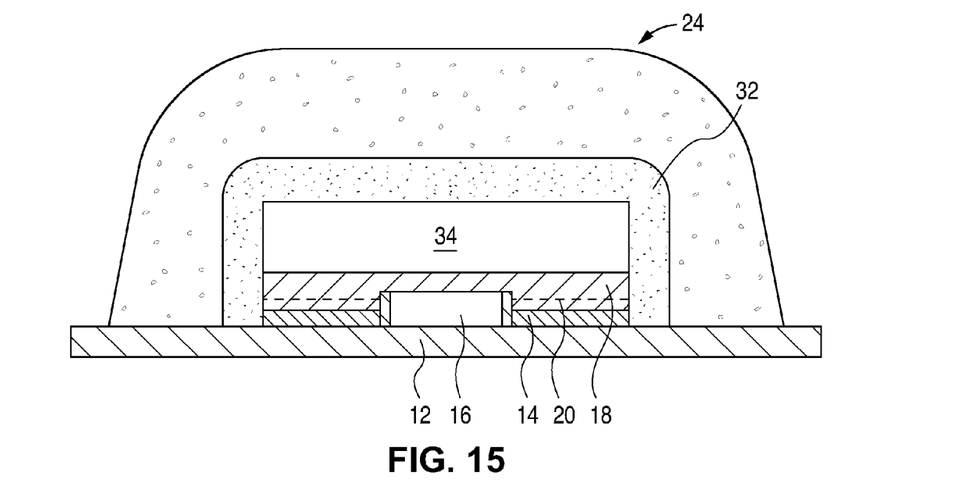
FIG. 15 illustrates a device including an LED, a conformal phosphor layer, and a phosphor disposed in a transparent layer.

FIG. 15 is a cross sectional view of a portion of a device including a blue emitting LED combined with a yellow or green emitting phosphor formed as a conformal layer and an $Eu^{3+}$ activated red emitting phosphor. In the device illustrated in FIG. 15, a yellow or green emitting phosphor is formed over the top of growth substrate 34 and the sides of growth substrate 34 and semiconductor structure 18 as a conformal layer 32. Conformal phosphor layer 32 may be formed by, for example, stenciling as described in U.S. Pat. No. 6,650,044, or by electrophoretic deposition as described in U.S. Pat. No. 6,576,488. Both of U.S. Pat. Nos. 6,650,044 and 6,576,488 are incorporated herein by reference. As in FIG. 13, a phosphor layer 24 including particles 28 of one or more red phosphors, including at least one $Eu^{3+}$ activated red emitting phosphor as described above, disposed in a transparent binder material 26 such as resin, silicone, or epoxy, is formed over conformal phosphor layer 32.

Figure 16:
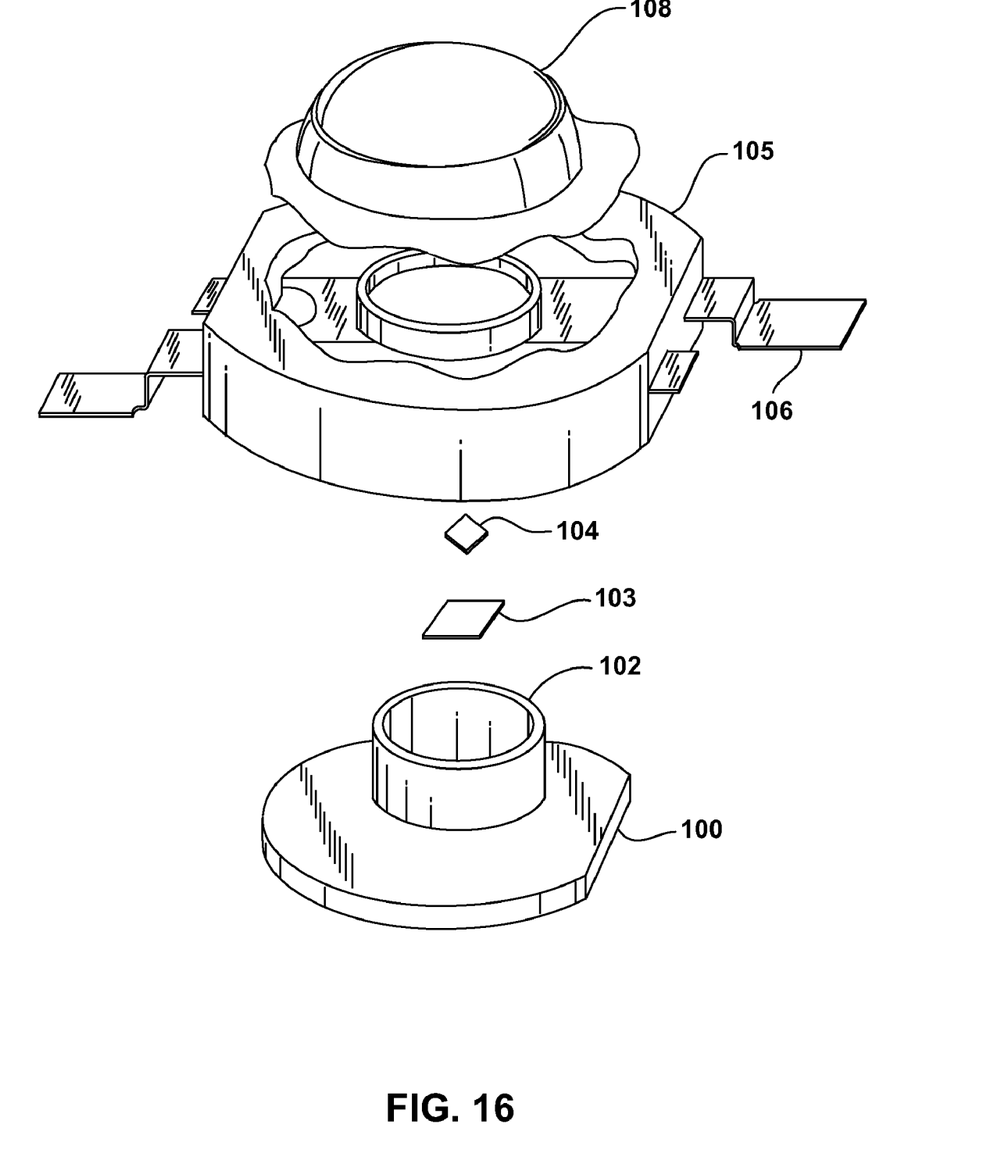
FIG. 16 is an exploded view of a packaged light emitting device.

FIG. 16 is an exploded view of a packaged light emitting device, as described in more detail in U.S. Pat. No. 6,274,924. A heat-sinking slug 100 is placed into an insert-molded leadframe. The insert-molded leadframe is, for example, a filled plastic material 105 molded around a metal frame 106 that provides an electrical path. Slug 100 may include an optional reflector cup 102. The light emitting device die 104, which may be any of the devices described in the embodiments above, is mounted directly or indirectly via a thermally conducting mount 103 to slug 100. A cover 108, which may be an optical lens, may be added.

In embodiments of the invention, the LED and the phosphors included in a white light device may be chosen to achieve a desired gamut through a preferred set of color filters, for example when the device is used as a backlight for an RGB display.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:

1. A device comprising:
a semiconductor structure comprising a light emitting layer disposed between an n-type region and a p-type region, the light emitting layer being configured to emit light having a first peak wavelength;
a first phosphor disposed in a path of light emitted by the light emitting layer, the first phosphor being configured to emit light having a second peak wavelength; and
a second phosphor disposed in a path of light emitted by the light emitting layer, the second phosphor being configured to emit light having a third peak wavelength, wherein:
the second phosphor comprises $Eu^{3+}$; and
in the excitation spectrum of the second phosphor at 298K and 1.013 bar, a maximum intensity in a wavelength range between 460 nm and 470 nm is at least 5% of a maximum intensity in a wavelength range between 220 nm to 320 nm.

2. The device of claim 1 wherein the semiconductor structure comprises a III-nitride structure.

3. The device of claim 1 wherein:
the first peak wavelength is blue;
the second peak wavelength is yellow or green; and
the third peak wavelength is red.

4. The device of claim 1 wherein the third peak wavelength is longer than the second peak wavelength.

5. The device of claim 1 wherein the first phosphor is formed over the semiconductor structure and the second phosphor is formed over the first phosphor.

6. The device of claim 1 wherein the first phosphor is disposed in a ceramic member.

7. The device of claim 6 wherein the second phosphor comprises a plurality of particles disposed in a transparent material disposed over the ceramic member.

8. The device of claim 6 wherein:
the ceramic member is a first ceramic member; and
the second phosphor is disposed in a second ceramic member.

9. The device of claim 8 wherein:
the second ceramic member is disposed over the first ceramic member; and
the first and second ceramic members are connected by an adhesive.

10. The device of claim 1 wherein the first phosphor is a conformal layer disposed over a top and a side surface of the semiconductor structure.

11. The device of claim 10 wherein the second phosphor comprises a plurality of particles disposed in a transparent material disposed over the conformal layer.

12. The device of claim 1 wherein the first phosphor is one of $(Lu_{1-x-y-a-b}Y_xGd_y)_3(Al_{1-z}Ga_z)_5O_{12}:Ce_aPr_b$ wherein $0<x<1$, $0<y<1$, $0<z\leqq0.1$, $0<a\leqq0.2$ and $0<b\leqq0.1$; $Lu_3Al_5O_{12}:Ce^{3+}$; $Y_3Al_5O_{12}:Ce^{3+}$; $SrSi_2N_2O_2:Eu^{2+}$; $(Sr_{1-u-v-x}Mg_uCa_vBa_x)(Ga_{2-y-z}Al_yIn_zS_4):Eu^{2+}$; $SrGa_2S_4:Eu^{2+}$; and $Sr_{1-x}Ba_xSiO_4:Eu^{2+}$.

13. The of claim 1 wherein in an emission spectrum of the second phosphor at 298 K and 1.013 bar, a peak area in a wavelength range between 680 nm and 720 nm is at least 15% of a peak area in a wavelength range between 570 nm and 720 nm.

14. The device of claim 1 wherein an atomic dopant level of Eu in the second phosphor material is less than or equal to 20%.

15. The device of claim 1 wherein the second phosphor further comprises a co-dopant comprising one of Bi, In, Tl, Sb, and mixtures thereof.

16. The device of claim 15 wherein a ratio in atom % of Eu:codopant in the second phosphor material is between 0.1:1 and 10:1.

17. The device of claim 1 wherein the second phosphor is selected from a group comprising oxides, oxyhalogenides, garnets, vanadates, tungstates, borates, silicates, germanates and mixtures thereof.

18. The device of claim 1 wherein the second phosphor is selected from a group comprising $(Gd_{1-x-z}Lu_x)_2O_3:Eu_z$, $(Y_{1-x-y-z}Gd_xLu_y)_3Al_5O_{12}:Eu_z$, $Ba_2(Y_{1-x-y-z}Gd_xLu_y)_2Si_4O_{13}:Eu_z$, $Ba_2(Y_{1-x-y-z}Gd_xLu_y)_2Ge_4O_{13}:Eu_z$, $(Y_{1-x-y-z}Gd_xLu_y)VO_4:Eu_z$, $(Y_{1-x-y-z}Gd_xLu_y)OF:Eu_z$, $(Y_{1-x-y-z}Gd_xLu_y)OCl:Eu_z$, $Ba(Y_{1-x-y-z}Gd_xLu_y)B_9O_{16}:Eu_z$, $Ba_3(Y_{1-x-y-z}Gd_xLu_y)(BO_3)_3:Eu_z$, $(Y_{1-x-y-z}Gd_xLu_y)_2SiO_5:Eu_z$, $(Ca_{1-a}Sr_a)_3(Y_{1-w-x-y-z}Lu_wGa_wIn_y)_2Ge_3O_{12}:Eu_z$ (a, w, x, y=0.0-1.0, z=0.0-0.2), $(Ca_{1-a}Sr_a)_3(Y_{1-w-x-y-z}Lu_vGa_wIn_x)_2Ge_3O_{12}:Eu_yBi_z$ (a, v, w, x=0.0-1.0, y, z=0.0-0.2), LaOM:Eu with M=(Br, Cl, I), $Na_9[(Y_{1-x-y-z}Lu_xGd_y)W_{10}O_{36}]:EU_z$, $(Y_{1-x-y-z}Lu_xGd_y)[P(Mo_3O_{10})_4]:Eu_z$ (x, y=0.0-1.0, z=0.0-0.2), and mixtures thereof.

19. The device of claim 1 wherein composite light emitted from the device, the composite light comprising a portion of light emitted by the light emitting layer, a portion of light emitted by the first phosphor, and a portion of light emitted by the second phosphor, has a correlated color temperature between 2800 and 3300K.

20. The device of claim 1 wherein composite light emitted from the device, the composite light comprising a portion of light emitted by the light emitting layer, a portion of light emitted by the first phosphor, and a portion of light emitted by the second phosphor, has a color rendering index Ra between 80 and 87.

* * * * *

UNITED STATES PATENT AND TRADEMARK OFFICE
CERTIFICATE OF CORRECTION

| | | |
|---|---|---|
| PATENT NO. | : 7,446,343 B2 | Page 1 of 1 |
| APPLICATION NO. | : 11/623068 | |
| DATED | : November 4, 2008 | |
| INVENTOR(S) | : Gerd O. Mueller et al. | |

It is certified that error appears in the above-identified patent and that said Letters Patent is hereby corrected as shown below:

Column 12, line 13, claim 13: Cancel "The of" and substitute --The device of--.

Signed and Sealed this

Fourteenth Day of April, 2009

JOHN DOLL
*Acting Director of the United States Patent and Trademark Office*